United States Patent [19]

Matsuoka

[11] Patent Number: 5,331,823
[45] Date of Patent: Jul. 26, 1994

[54] HEAT PUMP TYPE AIR CONDITIONER FOR AUTOMOTIVE VEHICLE

[75] Inventor: Takayoshi Matsuoka, Yokosuka, Japan

[73] Assignee: Nissan Motor Co, Ltd., Yokohama, Japan

[21] Appl. No.: 48,172

[22] Filed: Apr. 20, 1993

[30] Foreign Application Priority Data

Apr. 20, 1992 [JP] Japan .................................. 4-99681

[51] Int. Cl.$^5$ ............................................. F25B 29/00
[52] U.S. Cl. ..................................... 62/173; 62/196.4; 62/243; 454/93
[58] Field of Search ............... 454/93, 75; 165/43; 236/91 C; 62/209, 243, 196.4, 173

[56] References Cited

U.S. PATENT DOCUMENTS

| 3,738,117 | 6/1973 | Engel | 62/90 |
| 3,798,920 | 3/1974 | Morgan | 62/90 |
| 5,156,204 | 10/1992 | Doi | 165/43 X |

FOREIGN PATENT DOCUMENTS 2-130808 10/1990 Japan .
2-290475 11/1990 Japan .

*Primary Examiner*—William E. Wayner
*Attorney, Agent, or Firm*—Lowe, Price, LeBlanc & Becker

[57] ABSTRACT

A heat pump type air conditioner for an automotive vehicle has a compressor to which an outer heat exchanger and a heat-radiating inner heat exchanger are connected through a three-way valve. The heat-radiating inner heat exchanger is connected to a heat-absorbing inner heat exchanger through an expansion valve. The heat-absorbing inner heat exchanger is connected to the compressor. During a cooling operation the three-way valve is set to lead the refrigerant from the compressor to the outer heat exchanger. During a heating operation the three-way valve is set to lead the refrigerant from the compressor to the heat-radiating inner heat exchanger while bypassing the outer heat exchanger. The three-way valve is switched by a switching means when a target conditioned-air temperature, which is determined according to thermal information of the automotive vehicle, generally corresponds to a temperature at which clouding of windows is not caused by the relationship between a compartment temperature and an ambient temperature. Accordingly, the cooling and heating operations are stably implemented without being effected by various conditions, and the clouding of the windows is securely prevented while electric power consumption is deceased.

8 Claims, 11 Drawing Sheets

HEAT PUMP TYPE AIR CONDITIONER FOR AUTOMOTIVE VEHICLE

BACKGROUND OF THE INVENTION

1. Field of the Invention

The present invention relates to improvements in a heat pump type air conditioner applied to an automotive vehicle.

2. Description of the Prior Art

It is well known that a heat pump type air conditioner is applied to an automotive vehicle and provided with a four-way valve for changing refrigerant flow in a heating operation and a cooling operation. During the heating operation, an outer heat exchanger is used as a heat absorber and an inner heat exchanger is used as a heat radiator. On the other hand, during the cooling drive, the outer heat exchanger is used as a heat radiator and the inner heat exchanger is used as a heat absorber. Such a heat pump type air conditioner is disclosed, for example, in Japanese Patent Provisional Publication No.2-290475 and Japanese Utility Model Provisional Publication No.2-130808.

As shown in FIG. 12, during a heating operation, a four-way valve 2 is set as indicated by a continuous line in FIG. 12 and refrigerant is circulated as follows: A compressor 1→the four-way valve 2→a first inner heat exchanger 3→a heating heat exchanger 4→a second inner heat exchanger 5→an expansion valve 6→an outer heat exchanger 7→the four-way valve 2→a receiver 8→the compressor 1. Accordingly, the heat of the refrigerant is transmitted to air led by a blower fan 9 and used for heating a passenger compartment. The heat from an engine 10 is transmitted to the refrigerant through the heating heat exchanger 4 and further transmitted from the refrigerant to air forced by a blower fan 11 for heating the passenger compartment. The heat of the air blown by a fan 12 is transmitted to the refrigerant through the outer heat exchanger 7.

On the other hand, during the cooling operation, the four-way valve 2 is set as indicated by a broken line in FIG. 12 and refrigerant is circulated as follows: The compressor 1→the outer heat exchanger 7→tile expansion valve 6→the second inner heat exchanger 5→the first inner heat exchanger 3→the four-way valve 2→the receiver 8→the compressor 1. Accordingly, the heat of the refrigerant discharged from the compressor 1 is radiated into the atmosphere by the outer heat exchanger 7, the heat of air forced by the blower fans 9 and 11 is radiated into the refrigerant by the first and second inner heat exchanger 3 and 5, and the cooled air is supplied to the passenger compartment.

With such a conventional air conditioner, the absorbed heat amount by the outer heat exchanger 7 is decreased during the heating operation under a condition such that the ambient temperature is low, the automotive vehicle is running, or it is raining or snowing. Furthermore, if the workload of the compressor 1 is constant, the radiated heat amount from the first and second inner heat exchangers 3 and 5, which is the sum of the heat absorbing amount from the outer heat exchanger 7 and the workload of the compressor 1, is decreased, and the heating capacity of the air conditioner is lowered. Additionally, the lowering of the heating capacity invites frost on the heat exchanger. This increases a defrost operation and prevents a stable heating operation. Furthermore, since the conventional air conditioner is arranged such that the flow direction of the refrigerant is changed under the cooling and heating operations, it is necessary to change the design of the conduits of the outer and inner heat exchangers 7, 3 and 5 so as to be durable to high temperature and high pressure.

Also, since the conventional air conditioner is arranged to generate heated air for heating by utilizing the waste heat of the engine 10 during the heating operation, this air conditioner can not sufficiently operate if applied to a vehicle which only has a small heat source, such as to a solar car or electric vehicle.

Furthermore, since the conventional air conditioner is arranged to select one of the cooling and heating operations on the basis of the difference between a target outlet air temperature and an inlet air temperature to the inner heat exchangers 3 and 5, and can not simultaneously carry out both cooling and heating operations, a dehumidifying heating operation can not be implemented by the conventional air conditioner.

Additionally, it is necessary to exactly implement the dehumidifying heating operation so as not to cause the clouding or fogging of windows which is generated in connection with the relationship between the ambient air and the compartment air

SUMMARY OF THE INVENTION

It is an object of the present invention to provide an improved heat pump type air conditioner, which is free of the above-mentioned drawbacks.

In brief, the above-object is achieved by a heat pump type air conditioner for an automotive vehicle which has a compressor to which an outer heat exchanger and a heat-radiating inner heat exchanger are connected through a three-way valve. The heat-radiating inner heat exchanger is connected to a heat-absorbing inner heat exchanger through an expansion valve. The heat-absorbing inner heat exchanger is connected to the compressor. During a cooling operation the three-way valve is set to lead the refrigerant from the compressor to the outer heat exchanger. During a heating operation the three-way valve is set to lead the refrigerant from the compressor to the heat-radiating inner heat exchanger while bypassing the outer heat exchanger. The three-way valve is switched by a switching means when a target conditioned-air temperature, determined according to thermal information of the automotive vehicle generally corresponds to a temperature at which clouding or fogging of windows is not caused by the relationship between a compartment temperature and an ambient temperature.

More specifically, a first aspect of the present invention resides in a heat pump type air conditioner for an automotive vehicle. The air conditioner for an automotive vehicle comprises a compressor applying a workload to refrigerant. An outer heat exchanger connected to a refrigerant discharge side of the compressor and radiates heat of said refrigerant into ambient air. A blower leads air for air-conditioning the passenger compartment of the automotive vehicle. A heat-radiating inner heat exchanger is connected to the refrigerant discharge side of the compressor and transmits the heat of said refrigerant to the air led by the blower. An expansion valve is connected to a refrigerant outlet side of the heat-radiating inner heat exchanger. A heat-absorbing inner heat exchanger is connected to a refrigerant outlet side of the expansion valve. The heat-absorbing inner heat exchanger cools the air led by the blower by transmitting the heat of the air to the refrigerant which is supplied through the expansion valve from at least one of the outer heat exchanger and the heat-radiating inner heat exchanger. A switching device connects the compressor with the outer heat exchanger and the heat-radiating inner heat exchanger. The switching device is set at a first state in which the compressor is fluidly communicating with the outer heat exchanger and a second state in which the compressor is fluidly communicating with the heat-radiating inner heat exchanger. A control unit is communicating with the switching device. The control unit selectively controls the state of the switching device such that a temperature of air fed into the passenger compartment is controlled at a temperature at which clouding or fogging of vehicle windows is avoided. This temperature is determined from the relationship between a real compartment temperature and a real ambient temperature.

A second aspect of the present invention resides in a heat pump type air conditioner for an automotive vehicle. The air conditioner controls a condition of the passenger compartment of the automotive vehicle by its cooling and heating operations. The air conditioner comprises a compressor which applies a workload to the refrigerant. An outer heat exchanger is connected to a refrigerant discharge side of the compressor and radiates heat of the refrigerant into ambient air. A blower forces the air for air-conditioning the passenger compartment of the automotive vehicle. A heat-radiating inner heat exchanger is connected to the refrigerant discharge side of the compressor and transmits the heat of the refrigerant to the air blown by the blower. An expansion valve is connected to a refrigerant outlet side of the heat-radiating inner heat exchanger. A heat-absorbing inner heat exchanger is connected to the refrigerant outlet side of the expansion valve. The heat-absorbing inner heat exchanger cools the air blown by the blower by transmitting the heat of the air to the refrigerant which is supplied through the expansion valve from at least one of the outer heat exchanger and the heat-radiating inner heat exchanger. A switching valve is disposed among the refrigerant discharge side of the compressor, a refrigerant inlet side of the outer heat exchanger and a refrigerant inlet side of the heat-radiating inner heat exchanger. The switching valve leads the refrigerant from the compressor to the outer heat exchanger during the cooling operation. The switching valve leads the refrigerant to the heat-radiating inner heat exchanger without leading to the outer heat exchanger during the heating operation. A control unit communicating with the switching valve and controls the switching valve so as to implement a switching between the cooling and heating operations when a target outlet air temperature, according to thermal information of the automotive vehicle, generally corresponds to a boundary temperature at which clouding or fogging of windows of the automotive vehicle is not caused. This temperature is determined from the relationship between a real compartment temperature and a real ambient temperature.

A third aspect of the present invention resides in a heat pump type air conditioner for an automotive vehicle. The air conditioner controls the condition of a passenger compartment of the automotive vehicle by its cooling and heating operations. The air conditioner comprises a compressor which applies a workload to the refrigerant. An outer heat exchanger is connected to a refrigerant discharge side of the compressor and radiates heat of the refrigerant into ambient air. A blower forces air for air-conditioning the passenger compartment of the automotive vehicle. A heat-radiating inner heat exchanger is connected to the refrigerant discharge side of the compressor and transmits the heat of the refrigerant to the air blown by the blower. An expansion valve is connected to a refrigerant outlet side of the heat-radiating inner heat exchanger. A heat-absorbing inner heat exchanger is connected to the refrigerant outlet side of the expansion valve. The heat-absorbing inner heat exchanger cools the air led by the blower by transmitting the heat of the air to the refrigerant which is supplied through the expansion valve from at least, one of the outer heat exchanger and the heat-radiating inner heat exchanger. A switching valve is disposed among the refrigerant discharge side of the compressor, a refrigerant inlet side of the outer heat exchanger and a refrigerant inlet side of the heat-radiating inner heat exchanger. The switching valve directs the refrigerant from the compressor to the outer heat exchanger during the cooling operation. The switching valve directs the refrigerant to the heat-radiating inner heat exchanger without leading to the outer heat exchanger during the heating operation. A setting means primarily sets an outlet air temperature from the heat-absorbing inner heat exchanger within a range which is lower than an upper limit temperature at which clouding or fogging of windows of the automotive vehicle is not caused. This temperature is determined from the relationship between the relationship between a real compartment temperature and a real ambient temperature, and the temperature range is higher than an upper limit temperature at which said heat-absorbing inner heat exchanger will freeze, during the heating operation.

With this arrangement, the cooling and heating operations are stably implemented without being effected by various conditions, and the clouding or fogging of the windows are securely prevented while electric power consumption is deceased. Additionally, it is not necessary to use an electric heater and the like for heating the air dehumidified by this arrangement. This reduces an electric power consumption.

BRIEF DESCRIPTION OF THE DRAWINGS

In the drawings, like reference numerals designate like parts and like elements throughout all figures, in which.

DETAILED DESCRIPTION OF THE INVENTION

Referring to FIGS. 1 to 11, there is shown an embodiment of a heat pump type air conditioner for an automotive vehicle according to the present invention.

Figure 1:
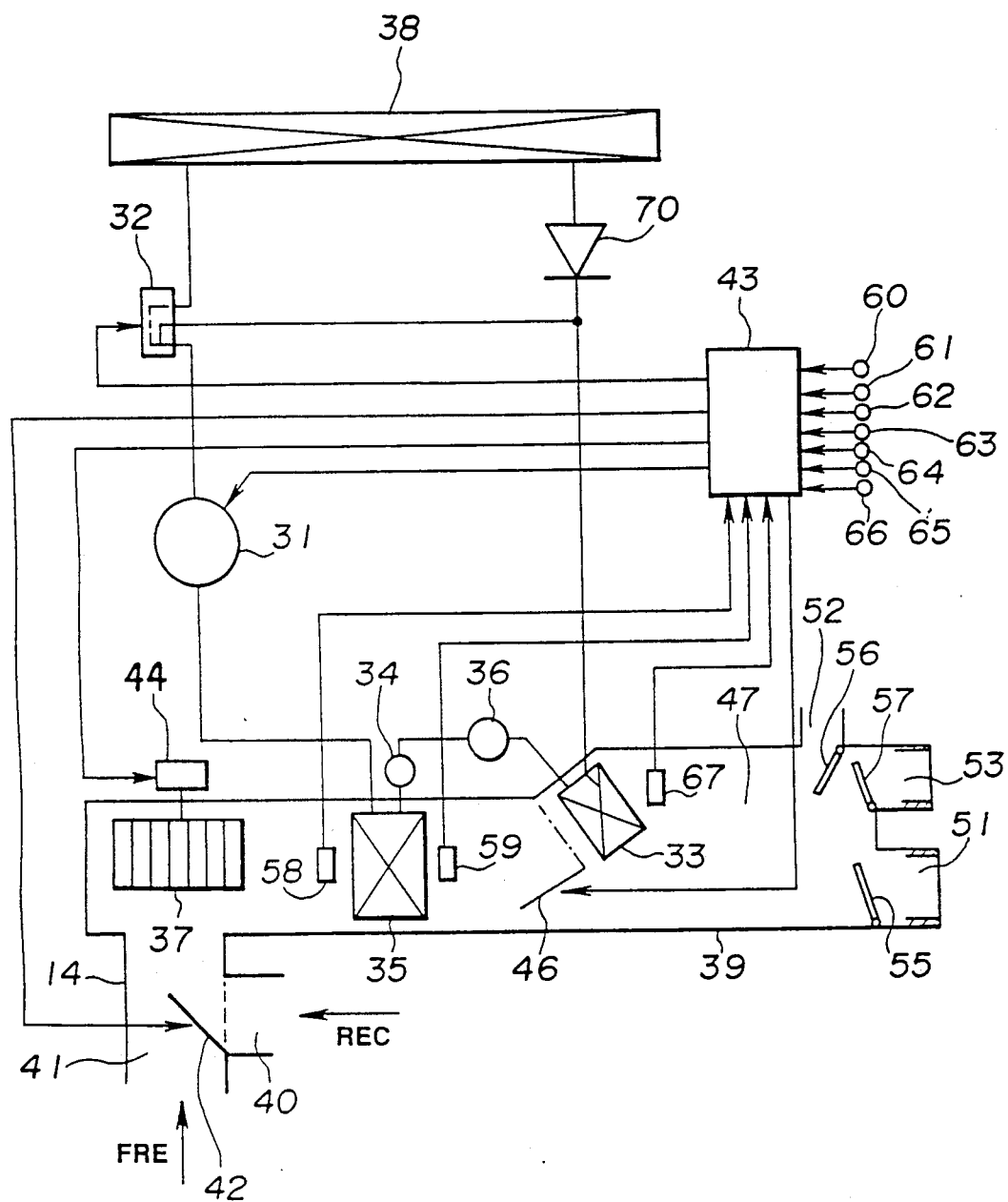
FIG. 1 is a schematic view showing a whole structure of an embodiment of a heat pump type air conditioner according to the present invention.

As shown in FIG. 1, a compressor 31 is disposed outside of a passenger compartment of the automotive vehicle, such as in an engine room. The compressor 31 is of a type in which input power is directly variable, such as of an electric drive type or hydraulic drive type. An outer heat exchanger 38 and a heat-radiating inner heat exchanger 33 are connected to a discharge side of the compressor 31 through a three-way valve 32. The outer heat exchanger 38 is disposed outside of the passenger compartment and serves as an outer condenser for radiating heat from refrigerant discharged from the compressor 31 into the atmosphere. The heat-radiating inner heat exchanger 33 is disposed in a duct 39 which is located at a front portion of the passenger compartment such as a back side of an instrument panel and which duct 39 serves as a main body of the air conditioner. The heat-radiating inner heat exchanger 33 serves as an inner condenser from a radiating type by which heat of the refrigerant discharged from the compressor 31 is radiated into air blown by a blower fan 37 functioning as a blowing means. The three-way valve 32 during a heating operation is set at a state shown by a continuous line in FIG. 1 and communicates with the discharge side of the compressor 31 and a refrigerant inlet of the heat-radiating inner heat exchanger 33. On the other hand, the three-way valve 32 during a cooling operation is set at a state shown by a broken line in FIG. 1 and communicates with the discharge side of the compressor 31 and the refrigerant inlet of the outer heat exchanger 38. The refrigerant outlet of the outer heat exchanger 38 is connected to the refrigerant inlet of the heat-radiating inner heat exchanger 33 through a one-way valve 70. The one-way valve 70 is arranged to allow refrigerant to flow from the outer heat exchanger 38 to the heat-radiating inner heat exchanger 33 and to prevent the refrigerant from flowing from the heat-radiating inner heat exchanger 33 to the outer heat exchanger 38. The refrigerant outlet of the heat-radiating inner heat exchanger 33 is connected to a refrigerant inlet of a heat-absorbing inner heat exchanger 35 through a receiver 36 and an expansion valve 34. The expansion valve 34 is disposed outside of the passenger compartment and serves as an expansion means for atomizing a liquid refrigerant by the adiabatic expansion. The heat-absorbing inner heat exchanger 35 is disposed at an upstream side of the heat-radiating inner heat exchanger 33 in the duct 39. The heat-absorbing inner heat exchanger 35 serves as an evaporator of an endothermic type by which the heat of the air blown by the blower fan 37 is absorbed into the refrigerant supplied from at least one of the outer heat exchanger 38 and the heat-radiating inner heat exchanger 33 through the expansion valve 34. The refrigerant outlet of the heat-absorbing inner heat exchanger 35 is connected to a suction side of the compressor 31.

In the duct 39, an inner air inlet 40 for leading the air from the passenger compartment to the duct 39 and an outer air inlet 41 for leading outside air due to the wind pressure caused by the running of the automotive vehicle are disposed upstream of the heat-absorbing inner heat exchanger 35. An intake door 42 for properly mixing the air from the inner air inlet 40 and the outer air inlet 41 is disposed at a dividing portion of the inner and outer air inlets 40 and 41 in the duct 39. The blower fan 37 is rotated by a blow fan motor 44 controlled by a control unit 43 and disposed downstream of the inner and outer air inlets 40 and 41 and upstream of the heat-absorbing inner heat exchanger 35 in the duct 39.

An air mixing door 46 is disposed upstream of the heat-radiating inner heat exchanger 33 in the duct 39. The air mixing door 46 is driven by an actuator (not shown) controlled by the control unit 43 so as to change the rate of the amounts of cool air and hot air, wherein the cool air is the air which bypasses the heat-radiating inner heat exchanger 33 and the hot air is the air which passes through the heat-radiating inner heat exchanger 33. An opening degree $X_{dsc}$ of the air mixing door 46 is defined as follows: When the air mixing door 46 is located at a position indicated by a long and short dash line in FIG. 1 and the rate of the cool air is 100%, the opening degree $X_{dsc}$ is defined as 0% (full close condition). When the air mixing door 46 is located at a position indicated by a continues line in FIG. 1 and the rate of the hot air is 100%, the opening degree $X_{dsc}$ is defined as 100% (full open condition).

In order to further improve the mixing of cool air and hot air, an air mixing chamber 47 is disposed downstream of the heat-radiating inner heat exchanger 33 in the duct 39. The air mixing chamber 47 has a ventilator outlet 51 for feeding the conditioned air toward an upper side of a vehicle passenger (though not shown), a foot outlet 52 for feeding the conditioned air toward a foot portion of the vehicle passenger, and a defroster outlet 53 for feeding the conditioned air toward a front glass (not shown) which will typically be a windshield. A ventilator door 55, a foot door 56, and a defroster door 57 are disposed in the air mixing chamber 47. The ventilator door 55 is arranged to open and close the ventilator outlet 51 owing to a ventilator door actuator (not shown) controlled by the control unit 43. The foot door 56 is arranged to open and close the foot outlet 52 owing to the foot door actuator (not shown) controlled by the control unit 43. The defroster door 57 is arranged to open and close the defroster outlet 53 owing to a defroster door actuator (not shown) controlled by the control unit 43.

The control unit 43 is connected to thermal information input means, such as an inlet air temperature sensor 58 for the heat-absorbing inner heat exchanger 35, an outlet air temperature sensor 59 for the heat-absorbing inner heat exchanger 35, a blowout air temperature sensor 60 of the ventilator outlet 51, a solar radiation sensor 61, an outer air (ambient) temperature sensor 62, a room air temperature sensor 63, an inner temperature setting device 64, a blowout outlet mode switch 65, a blower fan switch 66, and an outlet air temperature sensor 67 of the heat-radiating inner heat exchanger 33.

The inlet air temperature sensor 58 detects an inlet air temperature $T_{suc}$ and sends it to the control unit 43. The outlet air temperature sensor 59 detects a blowout air temperature $T_{out}$ and sends it to the control unit 43. The blowout air temperature sensor 60 detects a ventilator blowout air temperature $T_{vent}$ and sends it to the control unit 43. The solar radiation sensor 61 detects a solar radiation amount $Q_{sun}$ to the vehicle and sends it to the control unit 43. The outer air temperature sensor 62 detects an outer air temperature $T_{amb}$ and sends it to the control unit 43. The room air temperature sensor 63 detects a room air temperature $T_{room}$ and sends it to the control unit 43. A preset room temperature $T_{ptc}$ is inputted from the room temperature setting device 64 by a vehicle passenger and is sent to the control unit 43. The outlet air temperature sensor 67 detects a blowout air temperature $T_v$ and sends it to the control unit 43. The control unit 43 calculates target air-conditioning factors such as the air mixing door opening degree $X_{dsc}$, an input value $W_{comp}$ of the compressor 31, an air flow rate $V_{eva}$ passing through the second inner heat exchanger 35, and a target conditioned air temperature $T_{of}$, according to the above-mentioned thermal information. Furthermore, on the basis of the calculated values, the control unit 43 controls the compressor 31, the blower fan motor 44, the air-mixing door actuator, the return door actuator, the ventilator door actuator, the foot door actuator, and the defroster door actuator so as to keep the target air-conditioning factors to the calculated value.

In the heat pump type air conditioner according to the present invention, a switching between the cooling and heating operations is implemented in such a manner that the control unit 43 controls the switching of the three-way valve 32 according to a preset temperature stored in the control unit 43. That is to say, in this embodiment, the control unit 43 functions as a means for operating a passage switching means (three-way valve). The preset temperature memorized in the control unit 43 is determined to a point at which a target conditioned air temperature according to the thermal information generally corresponds to a boundary temperature at which window-clouding or fogging not caused due to the relationship between the detected room temperature $T_{room}$ and the ambient temperature $T_{amb}$. During the heating operation, the air-conditioning operation is implemented such that the outlet air temperature $T_{out}$ from the heat-absorbing inner heat exchanger 35 primarily becomes lower than the temperature $T_{fine}$ so that clouding or fogging of windows of the automotive vehicle is caused due to the relationship between the detected room temperature $T_{room}$ and the ambient temperature $T_{amb}$ and such that the outlet air temperature $T_{out}$ becomes higher than an upper limit temperature $T_{seto}$ at which the freezing of the heat-absorbing inner heat exchanger 35 occurs ($T_{seto} < T_{out} < T_{fine}$). That is to say, in this embodiment, the control unit 43 functions as a means for primarily adjusting the target conditioned air temperature (the outlet air temperature from the heat-absorbing inner heat exchanger 35) within the range between the temperature $T_{fine}$ and the freezing limit temperature $T_{seto}$.

Figure 2:
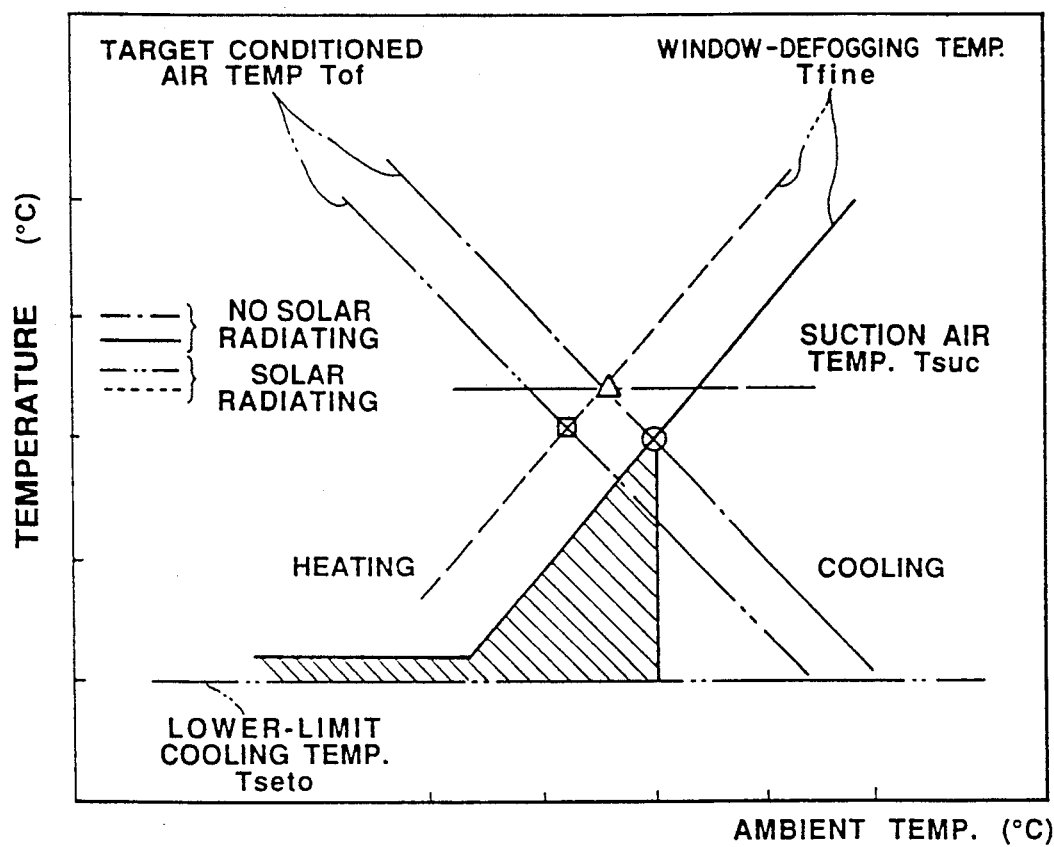
FIG. 2 is a conceptual view for selecting a switching between cooling and heating operations applied to the embodiment of FIG. 1.

FIG. 2 shows a condition for selecting one of a cooling operation and a heating operation. In FIG. 2, a horizontal axis indicates ambient temperature, and a vertical axis indicates a common temperature. Furthermore, an inclined alternate long and short dash line indicates a target conditioned-air temperature $T_{of}$ according to the thermal information under no solar radiation. Thus, the compartment temperature is maintained at the preset temperature by feeding air which is conditioned at the target conditioned-air temperature $T_{of}$ calculated according to certain thermal information relating to the automotive vehicle. An inclined alternate long and two short dashes line indicates a target conditioned-air temperature $T_{of}$ under solar radiation. An inclined continuous line indicates a window-defogging temperature $T_{fine}$ which relates to the fining or defogging of windows of the automotive vehicle. Thus, during heating operation, the window-defogging temperature $T_{fine}$ takes an upper-limit cooling temperature at the heat-absorbing inner heat exchanger 35, and in this embodiment, the window-defogging temperature $T_{fine}$ is determined on the basis of the ambient temperature $T_{amb}$. That is, by once cooling the air until becomes lower than a temperature indicated by a continuous line with respect to a certain ambient temperature, the window-clouding or fogging by the conditioned air is avoided. Short dashed incline line indicates a window-defogging temperature $T_{fine}$ under solar radiation or during glass heating by a heater. A horizontal alternate long and short dash line indicates a suction air temperature $T_{suc}$ of the heat-absorbing inner heat exchanger 35. The difference between the ambient temperature and the compartment air temperature approaches zero under a circumstantial condition in the vicinity of a crossing point between the inclined alternate long and short dash line and the inclined real line. A horizontal alternate long and two short dashes line indicates a lower-limit cooling temperature $T_{seto}$ at which the freezing of the heat-absorbing inner heat exchanger 35 occurs. If the air conditioner is operated for a long time while keeping the temperature of the heat-absorbing inner heat exchanger 35 at the lower-limit cooling temperature $T_{seto}$, the heat-absorbing inner exchanger 35 may freeze and become impossible to continue in operation.

In a conventional heat-pump type air conditioner, a switching between cooling and heating operations is implemented according to the comparison between the suction air temperature $T_{suc}$ of the heat-absorbing inner heat exchanger 35 and the target conditioned-air temperature $T_{of}$. That is, when it is judged that the suction air temperature $T_{suc}$ of the heat-absorbing inner heat exchanger 35 is lower than the target conditioned-air temperature $T_{of}$ ($T_{suc} < T_{of}$), the heating operation is implemented. In contrast, according to the present invention, when the window-defogging temperature $T_{fine}$ becomes lower than the target conditioned-air temperature $T_{of}$, a heating operation is implemented in order to primarily implement the window fining or defogging operation. That is to say, in case of no solar radiation, in the area left of the intersection (marked by a circle) between the inclined alternate long and short dash line and the continuous line in FIG. 2, a heating operation is implemented. Similarly, in case of a solar radiating condition, in the area left of the intersection (marked by a rectangle) between the inclined alternate long and two short dashes line and the broken line in FIG. 2, the heating operation is implemented.

That is to say, in case that the switching between the cooling and heating operations is implemented at an intersection (marked by a triangle) between the inclined alternate long and short dash line and the inclined short dashes line, the window-defogging temperature $T_{fine}$ is larger than the target conditioned-air temperature $T_{of}$ in almost the full range of the cooling operation, and the windows of the vehicle easily become fine (defogged) by merely lowering the conditioned-air temperature to the target conditioned-air temperature $T_{fine}$. However, in the vicinity of the area between the triangle-marked point and the circle-marked point, the target conditioned-air temperature $T_{of}$ becomes larger than the window-defogging temperature $T_{fine}$. Accordingly, it should be understood that the window does not become fine or defogged by merely cooling to the target conditioned-air temperature $T_{of}$. Therefore, in the vicinity of the temperature range between the triangle-marked point and the circle-marked point, the heating operation is selected and implemented. With this arrangement, it becomes possible that the conditioned-air temperature is lowered until it becomes lower than the window-defogging temperature and again heated to the target conditioned-air temperature. This enables the window-defogging characteristics to be ensured. Accordingly, it becomes possible to securely prevent the clouding or fogging of the windows by switching control between the cooling and heating operations.

Accordingly, in case of the no solar radiation, in the vicinity of the circle-marked point, even if the suction air temperature $T_{suc}$ becomes larger than the target conditioned-air temperature $T_{of}(T_{suc}>T_{of})$ so that the cooling operation should be implemented, the heating operation is selected. Further, the dehumidifying heating operation is implemented under a condition in the vicinity of the area between the circle-marked point and the triangle-marked point while air passing through the heat-absorbing inner heat exchanger 35 is slightly cooled and the input power to the compressor 31 is kept small. Accordingly, the temperature of the air passing through the heat-absorbing inner heat exchanger 35 is almost not changed, and merely dehumidified. Then, the air is fed to the passenger compartment. Furthermore, if the air conditioner is operated under a bi-level mode, it becomes possible to differentiate the temperatures between the upper outlet air and the lower outlet air. This enables the air conditioner to be operated without causing discomfort to passengers in the vehicle.

Figure 3:
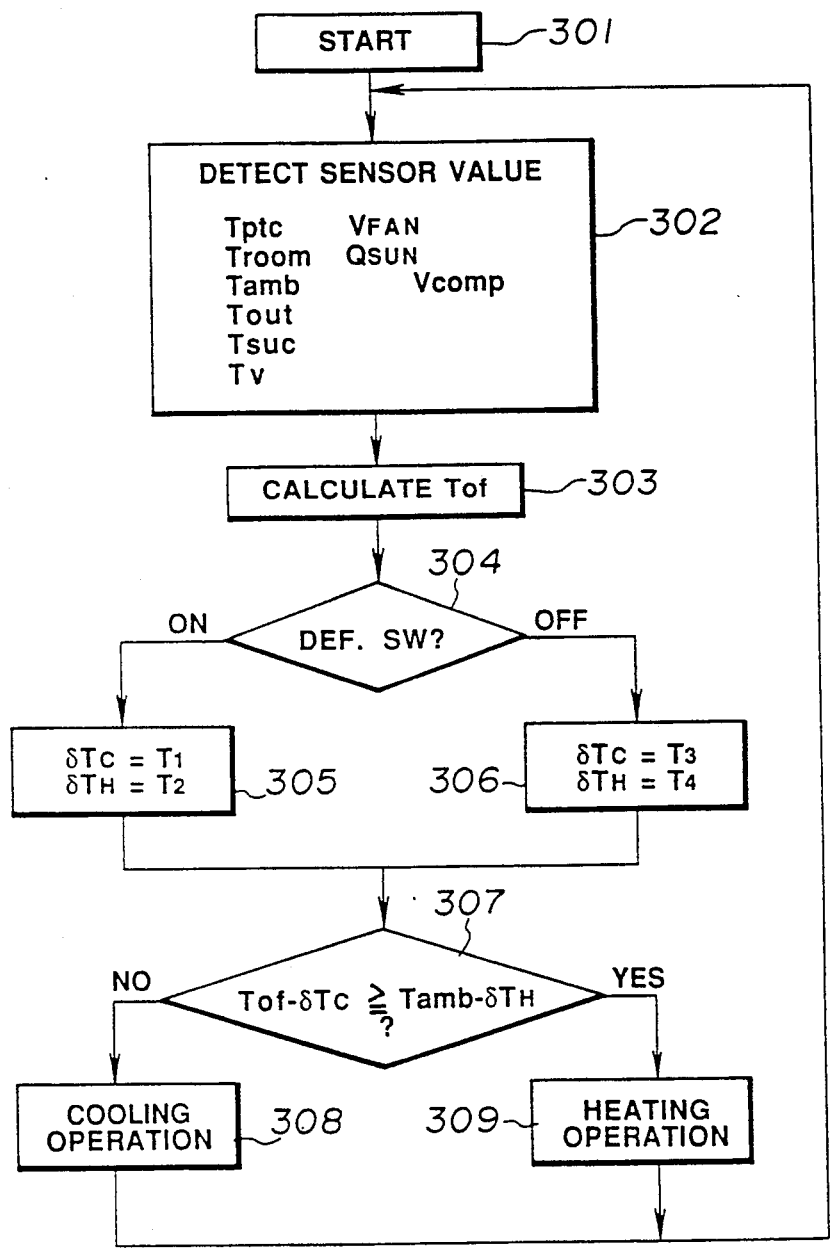
FIG. 3 is a flow chart for selecting one of the cooling and heating operations of the embodiment.

FIG. 3 shows a flow chart which indicates a process for selecting one of the cooling operation and the heating operation. The program shown in FIG. 3 starts in reply to the turning-on of the control unit 43 which is caused by the turning-on of the main switch of the air conditioner, as a step 301.

In a step 302, the respective sensors output the respective outputs to the control unit 43. That is, a compartment temperature preset device 64 outputs a signal indicative of the preset compartment temperature $T_{ptc}$. A compartment temperature sensor 63 outputs a signal indicative of a real compartment temperature $T_{room}$. The ambient temperature sensor 59 outputs a signal indicative of the ambient air temperature $T_{amb}$. The air temperature sensor 59 outputs a signal indicative of an outlet air temperature $T_{out}$ of the heat-absorbing inner heat exchanger 35. The air temperature sensor 58 outputs a signal indicative of a suction air temperature $T_{suc}$ of the heat-absorbing inner heat exchanger 35. The air temperature sensor 67 outputs a signal indicative of an outlet air temperature $T_v$ of the heat-radiating inner heat exchanger 33. The voltage $V_{fan}$ applied to the fan motor 44 is outputted to the control unit 43. A physical amount $V_{comp}$ indicative of the workload of the compressor 31 is outputted to the control unit 43. The discharge amount from the compressor 31 is increased in proportion to the increase of the physical amount $V_{comp}$, and the workload of the compressor 31 is similarly increased. If an electric compressor is applied to the compressor 31, the physical amount $V_{comp}$ corresponds to frequency.

In a step 303, a target conditioned air temperature $T_{of}$ is calculated on the basis taken from heat-load information which is of the thermal information detected in the step 302.

In a step 304, it is judged whether the defroster switch is turned on or not. When the defroster switch is turned on, the program proceeds to a step 305. When the defroster switch is turned off, the program proceeds to a step 306.

In the step 305, correction terms relative to a target cooling condition of the heat-absorbing inner heat exchanger 35 are determined under the defroster switch turned-on condition. That is, relative to the target value $T_{of}$ of the outlet air temperature of the heat-absorbing inner heat exchanger 35 under the cooling operation, a correction term $\delta T_C$ is determined to $T_1$. Further, relative to the upper-limit cooling temperature (window-defogging temperature $T_{fine}$) under the heating operation, a correction term $\delta T_H$ is determined to $T_2$. In case that the defroster switch is turned on, the amount of dehumidification is increased by setting the target cooling temperature to be lower than a normal value, and the amount of the heating by the heat-radiating inner heat exchanger 33 is increased. Therefore, the temperature of the outlet conditioned air to the compartment is adjusted to a target temperature.

Similarly, in the step 306, the correction terms $\delta T_C$ and $\delta T_H$ relative to the target cooling condition of the heat-absorbing inner heat exchanger 35 are determined, that is, the correction term $\delta T_C$ is determined to $T_3$ and the correction term $\delta T_H$ is determined to $T_4$.

In a step 307, taking the correction terms $\delta T_C$ and $\delta T_H$ determined in the step 305 or step 306 into consideration, the cooling conditions at the heat-absorbing inner heat exchanger 35 under the cooling operation and the heating operation are compared. When the cooling condition under the cooling operation becomes lower than or equal to the cooling condition under the heating operation $(T_{of}-\delta T_C \leq T_{amb}-\delta T_H)$, that is, when the judgment in the step 307 is "NO", the program proceeds to a step 308 wherein the cooling operation is implemented. When the cooling condition under the heating condition is higher than the cooling condition under the cooling condition $(T_{of}-\delta T_C > T_{amb}-\delta T_H)$, that is, when the judgment in the step 307 is "YES", the program proceeds to a step 309 wherein the heating operation is implemented.

Figure 4:
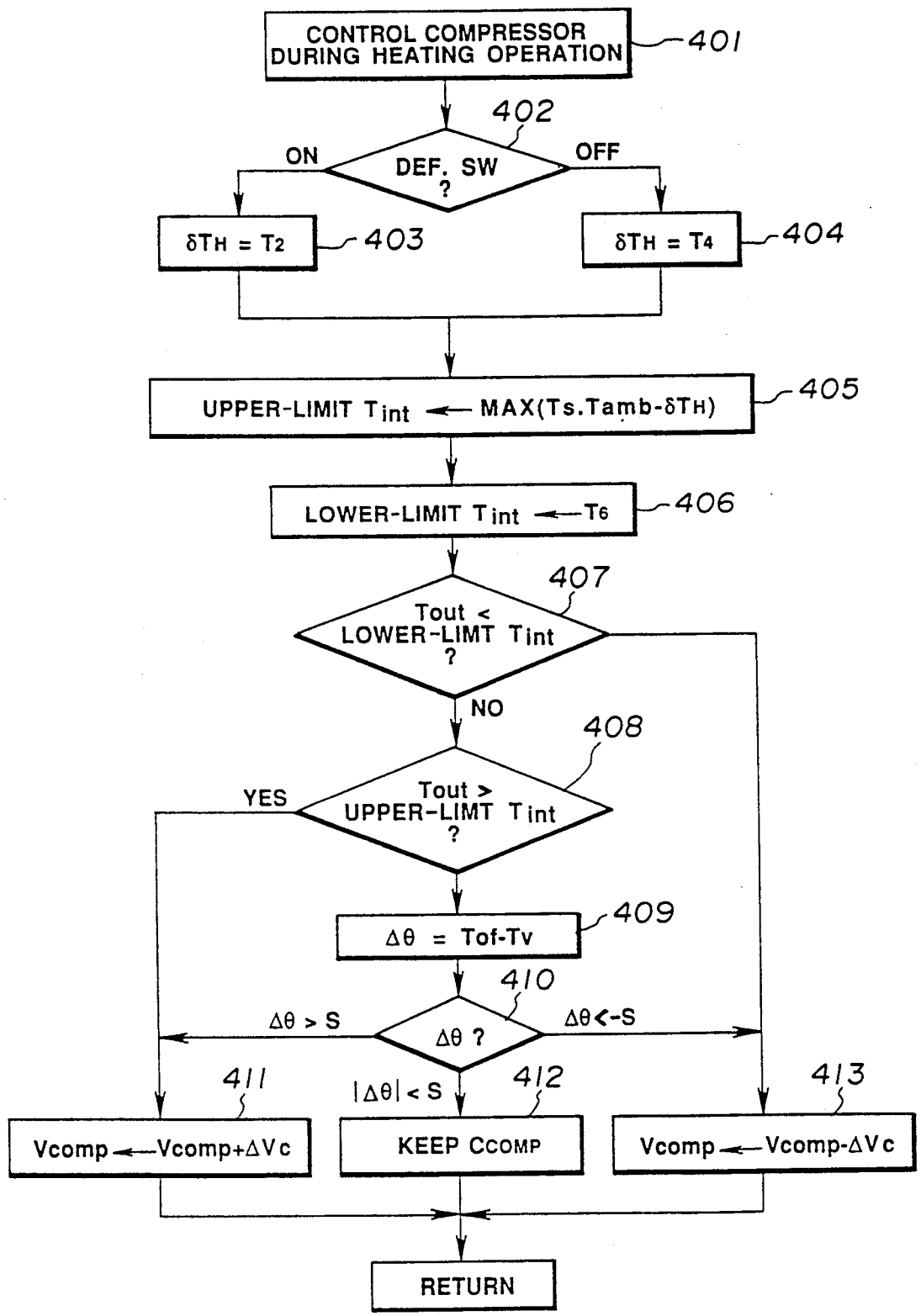
FIG. 4 is a flow chart for controlling a compressor of the embodiment of FIG. 1 during the heating operation.

FIG. 4 shows a flow chart for a control of the compressor 31 during the heating operation.

In a step 401, the heating operation is started. Following this, in a step 402, it is judged whether the defroster switch is turned on or not. When the defroster switch is turned on, the program proceeds to a step 403 wherein the correction term $\delta T_H$ is determined to $T_2$. When the defroster switch is turned off, the program proceeds to a step 404 wherein the correction term $\delta T_H$ is determined to $T_4$.

In a step 405, the preset upper-limit cooling temperature $T_5$ at a low ambient temperature and the upper-limit cooling temperature $T_{fine}$ on the basis of the ambient air temperature $T_{amb}$ are compared, the larger one of them is determined as the upper-limit cooling temperature (upper-limit $T_{int}$) under the heating operation. Although the ambient temperature is used as a representative one of elements for determining the upper-limit cooling temperature in this embodiment, it will be understood that the thermal circumstantial condition of the vehicle or the output of the window-clouding or fogging sensor may be used as an element for determining the upper-limit cooling temperature.

In a step 406, the temperature $T_{seto}(T_6)$ is determined on the basis of the freezing of the heat-absorbing inner heat exchanger 35 and is established as the lower-limit cooling temperature (lower-limit $T_{int}$).

In a step 407, it is judged whether or not the outlet air temperature $T_{out}$ of the heat-absorbing inner heat exchanger 35 is lower than the lower-limit cooling temperature (the lower-limit $T_{int}$). When $T_{out}<$ lower-limit $T_{int}$, the program proceeds to a step 413 wherein the workload of the compressor 31 is reduced by $\Delta V_C$ so as to raise the outlet air temperature of the heat-absorbing inner heat exchanger 35 and to adjust the temperature within the range between the upper-limit cooling temperature and the lower-limit cooling temperature, in order to avoid the freezing of the heat-absorbing inner heat exchanger 35. During this operation, a control for raising the inlet air temperature of the heat-absorbing inner heat exchanger 35 is implemented so as to prevent the outlet air temperature of the heat-absorbing inner heat exchanger 35 from being lowered due to the decrease of the workload of the compressor 31.

When $T_{out}>$ lower-limit $T_{int}$ in the step 407, the program proceeds to a step 408 wherein it is judged whether or not the outlet air temperate $T_{out}$ of the heat-absorbing inner heat exchanger 35 is larger than the upper-limit cooling temperature (upper-limit $T_{int}$) determined in the step 405.

When $T_{out}>$ upper-limit $T_{int}$ in the step 408, the program proceeds to a step 411 wherein the workload of the compressor 31 is increased by $\Delta V_C$ and the outlet air temperature of the heat-absorbing inner heat exchanger 35 is lowered in order to ensure the predetermined dehumidification amount of the conditioned-air. In contrast, when $T_{out}<$ upper-limit $T_{int}$ in the step 408, the program proceeds to the step 409 wherein a deviation $\Delta\theta$ between the target conditioned-air temperature $T_{of}$ and the outlet conditioned-air $T_y$ of the heat-radiating inner heat exchanger 35 is calculated.

When $\Delta\theta > S$ in the step 410, that is, when the outlet air temperature does not reach the target conditioned-air temperature $T_{of}$, the program proceeds to a step 411 wherein the workload of the compressor 31 is increased by $\Delta V_C$ in order to raise the outlet temperature. When $\Delta\theta < -S$ in the step 410, the program proceeds to a step 413 wherein the workload of the compressor 31 is decreased by $\Delta V_C$ in order to lower the outlet air temperature. When $-S \leq \Delta\theta \leq S$ ($|\Delta\theta| \leq S$), the program proceeds to a step 412 wherein the workload of the compressor 31 is maintained.

With the heating operation by the heat pump type air conditioner according to the present invention, it becomes possible to continuously operate the heating operation without the operation being affected by the ambient temperature. The predetermined changing amount of the workload of the compressor 31 always generates the predetermined change in the outlet air temperature (the change in the radiating heat amount to the compartment) without being effected by the ambient temperature or the running condition of the vehicle. Furthermore, since during the heating operation, the dehumidifying operation is always implemented by the heat-absorbing inner heat exchanger 35, it becomes possible for the dehumidifying temperature control to be implemented without causing an unstable phenomenon by the compressor control as shown in FIG. 4.

Figure 5:
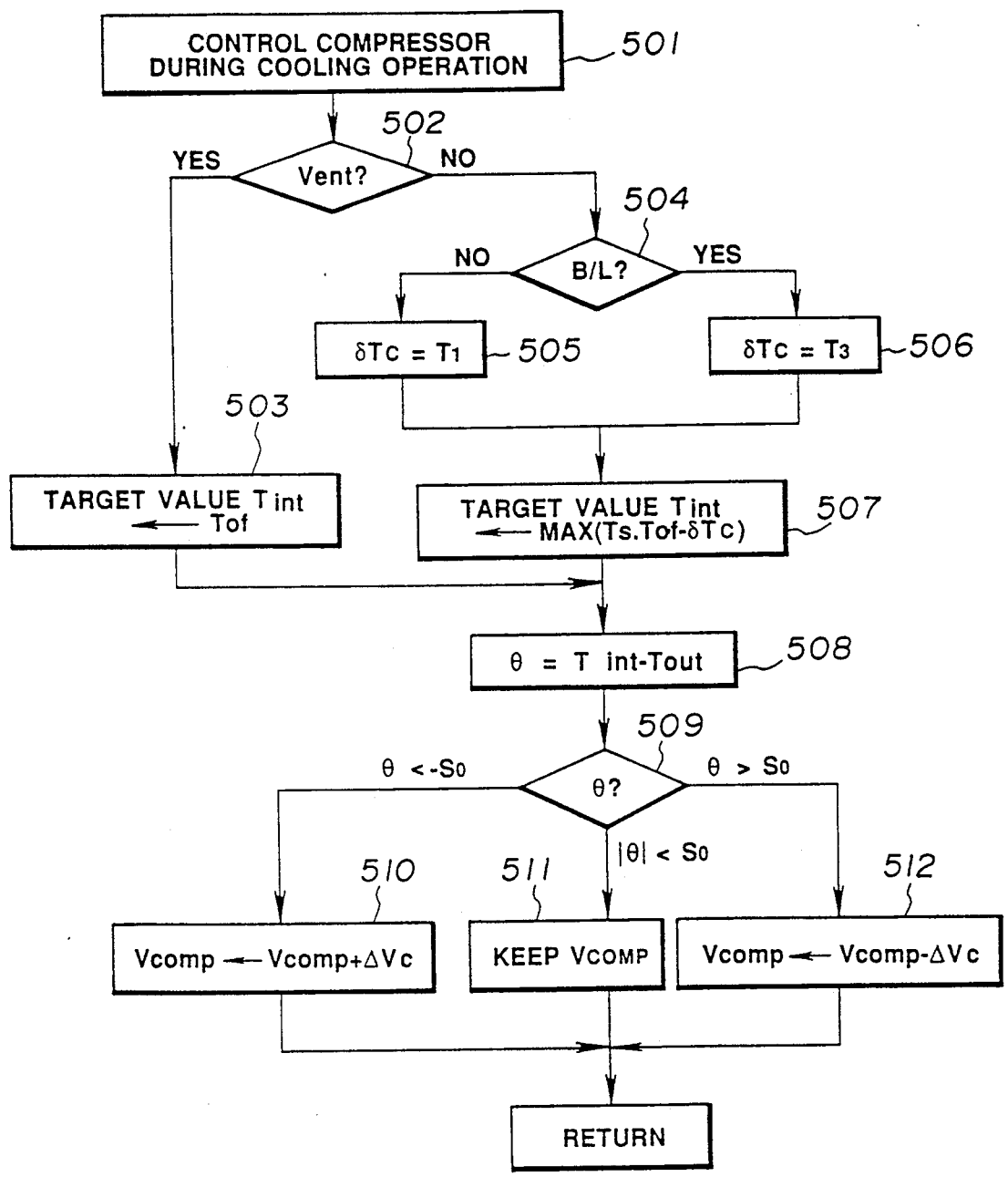
FIG. 5 is a flow chart for controlling the compressor of the embodiment of FIG. 1 during the cooling operation.

FIG. 5 shows a flow chart for a compressor control under the cooling operation. In a step 501, the cooling operation is started. Following this, in a step 502, it is judged whether the outlet air is blown out from the ventilator outlet or not (Vent. mode ?).

In case that the outlet air is blown out from the ventilator outlet, that is, when the judgment in the step 502 is "YES", it is a most effective way for saving energy to cool the air fed to the heat-absorbing inner heat exchanger 35 to a target outlet air temperature and to blow it into the compartment. Accordingly, in order to accomplish the above-mentioned operation, the program proceeds to a step 503 wherein the target outlet air temperature $X_M (T_{of})$ is set to the target temperature $T_{int}$ of the heat-absorbing inner heat exchanger 35.

When the outlet air is not blown out from the ventilator outlet, that is, when the judgment in the step 502 is "NO", the program proceeds to a step 504 wherein it is judged whether the air conditioner is operated under a bi-level mode or not. When the bi-level mode is implemented, the program proceeds to a step 506 wherein the correction term $\delta T_C$ is set to $T_3$ ($\delta T_C = T_3$). When the bi-level mode is not implemented, the program proceeds to a step 505 wherein the correction term $\delta T_C$ is set to $T_1$ ($\delta T_C = T_1$). The correction term $\delta T_C$ is increasingly changed in accordance with the increase of the reheating amount in the heat-radiating inner heat exchanger 33.

In a step 507, the target air temperature $T_{int}$ of the outlet air from the heat-absorbing inner heat exchanger 35 is set to a larger one of the temperature $T_5$ used in the step 405 and the value which is obtained by correcting the target outlet air temperature $T_{of}$ by the correction term $\delta T_C$ determined in the step 505 or 506.

In a step 508, the difference $\theta$ between the target temperature $T_{int}$ calculated in the step 503 or 507 and the outlet air temperature $T_{out}$ of the heat-absorbing inner heat exchanger 35 is calculated.

In a step 509, when the difference $\theta$ is lower than $-S_0$ ($\theta < -S_0$), the program proceeds to a step 510 wherein the workload of the compressor 31 is increased by $\Delta V_C$ so as to lower the outlet air temperature of the heat-absorbing heat exchanger 35. When the difference $\theta$ is larger than $S_0$ ($\theta > S_O$), it is judged that the workload of the compressor 31 is increased. Accordingly, the program proceeds to a step 512 wherein the workload of the compressor 31 is decreased by $\Delta V_C$. When the difference $\theta$ takes other values, that is, when $-S_0 \leq \theta \leq S_0$, the workload of the compressor 31 is maintained.

With the thus arranged embodiment of the system according to the present invention, during the heating operation, the three-way valve 32 is switched as indicated by a continuous line in FIG. 1, and the refrigerant is circulated as follows: The compressor 31→the three-way valve 32→the heat-radiating inner heat exchanger 33→the receiver 36→the expansion valve 34→the heat-absorbing inner heat exchanger 35→the compressor 31.

Accordingly, the air led by the blower fan 37 is heated by the refrigerant passing through the heat-radiating inner heat exchanger 33. Air led by the fan flow 37 is cooled by the refrigerant passing through the heat-absorbing inner heat exchanger 35.

On the other hand, during a cooling operation the three-way valve 32 is switched as indicated by a dotted line in FIG. 1, and the refrigerant in the system is circulated as follows: The compressor 31→the three-way valve 32→the outer heat exchanger 38→the one-way valve 70→the heat-radiating inner heat exchanger 33→the receiver 36→the expansion valve 34→the heat-absorbing inner heat exchanger 35→the compressor 31. Accordingly, the outer heat exchanger 38 transmits the heat of the refrigerant discharged from the compressor 31 into the atmosphere. Furthermore, the remaining heat of the refrigerant is transmitted to the air by the blower fan 37 through the heat-radiating inner heat exchanger 33. The heat-absorbing inner heat exchanger 35 transmits the heat of the air blown by the fan blower 37 or blown by the ram pressure during the vehicle running, to the refrigerant. Therefore, the air passing through the heat-radiating inner heat exchanger 33 is heated and the air passing through the heat-absorbing inner heat exchanger 35 is cooled.

That is to say, during the heating operation, the amount of the absorbed heat of the heat-absorbing inner heat exchanger 35 and the workload corresponding to the real input value $W_{comp}$ of the compressor 31 are radiated from the heat-radiating inner heat exchanger 33 due to the starting of the compressor 31. Accordingly, air whose temperature is higher than the inlet air temperature $T_{suc}$ of the heat-absorbing inner heat exchanger 35 is fed to the passenger compartment. That is to say, the inlet air temperature $T_{suc}$ is raised with the lapse of the driving time, and the real input value $W_{comp}$ of the compressor 31 is increased. Accordingly, the passenger compartment is heated in an accelerated fashion. Furthermore, since the air passed through the heat-absorbing inner heat exchanger 35 is led to the heat-radiating inner heat exchanger 33, the efficiency of the compressor 31 is justified into optimum and the real input value $W_{comp}$ is determined so as not to freeze the heat-absorbing inner heat exchanger 35 relative to the heat load of the air passing through the heat-absorbing inner heat exchanger 35.

Hereinafter, the heating operation under the condition shown in the vicinity of the circle-marked point and the triangle-marked point will be discussed in detail with reference to FIG. 6 which is an enlarged view of an area in the vicinity of the switching point between cooling and heating operations.

Figure 6:
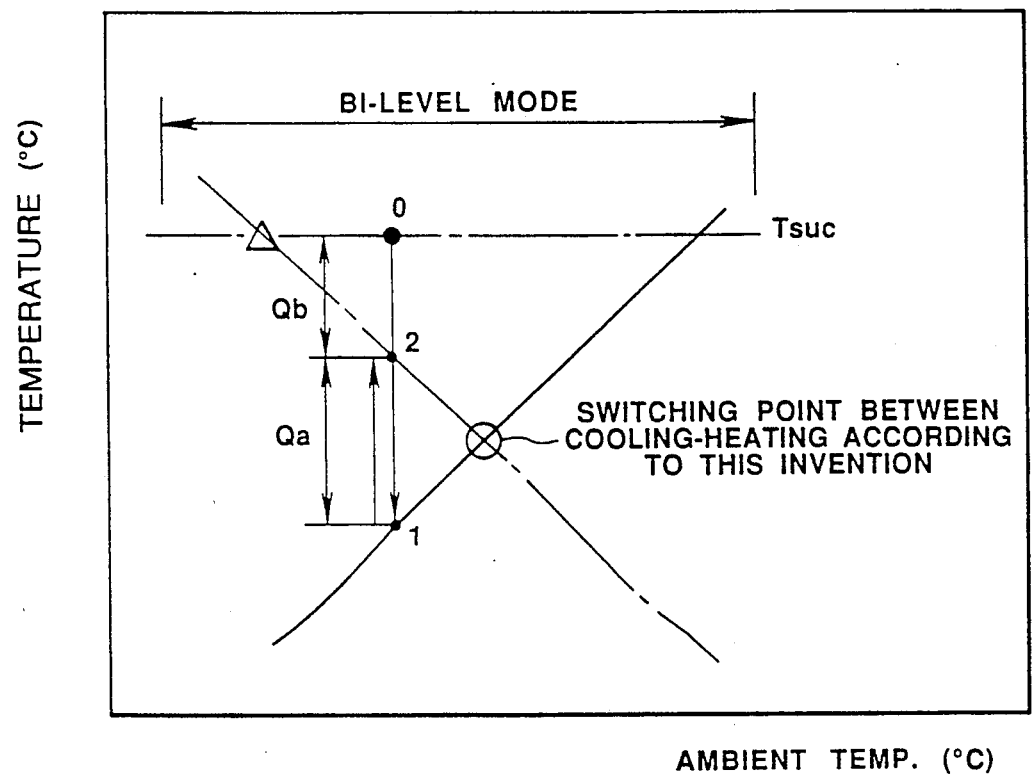
FIG. 6 is an enlarged partial view of FIG. 2.
Figure 7:
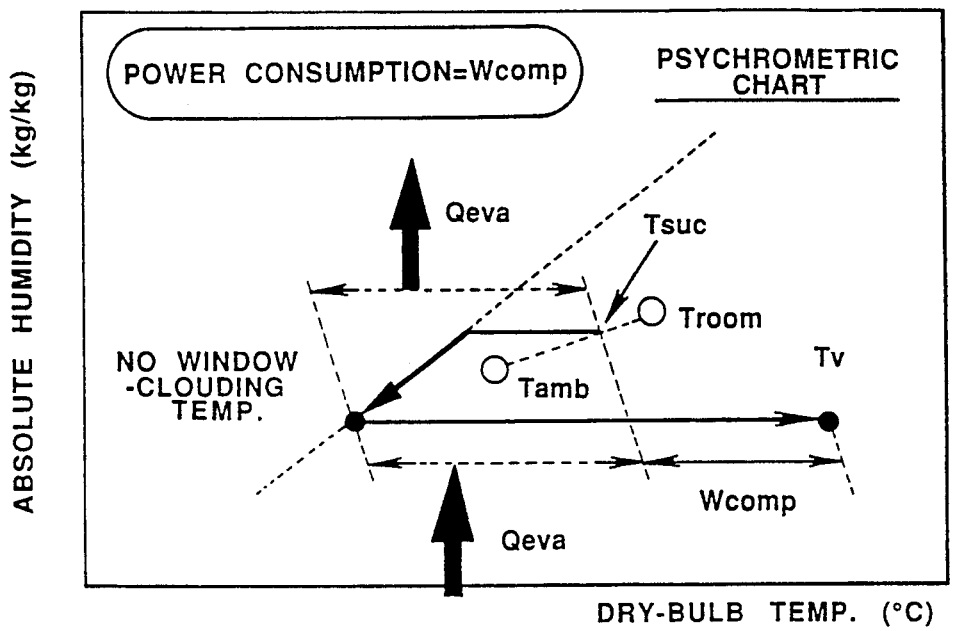
FIG. 7A is a psychrometric chart of the embodiment of FIG. 1 under a condition that the dehumidifying heating is implemented at a temperature which is not so low.
FIG. 7B is a psychrometric chart of the conventional air conditioner under a condition that the dehumidifying heating is implemented at a temperature which is not so low.
Figure 7:
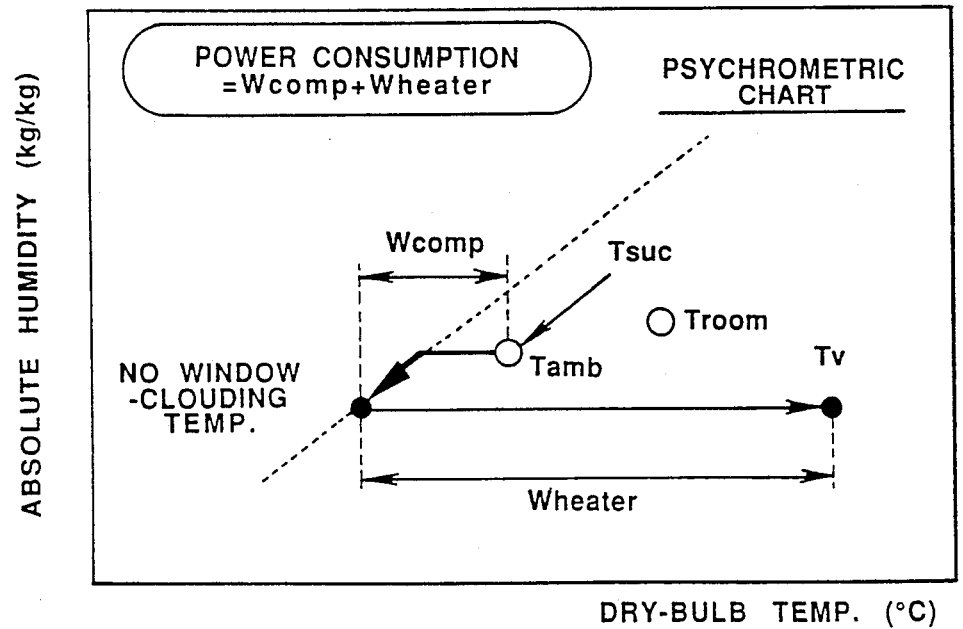
Figure 8:
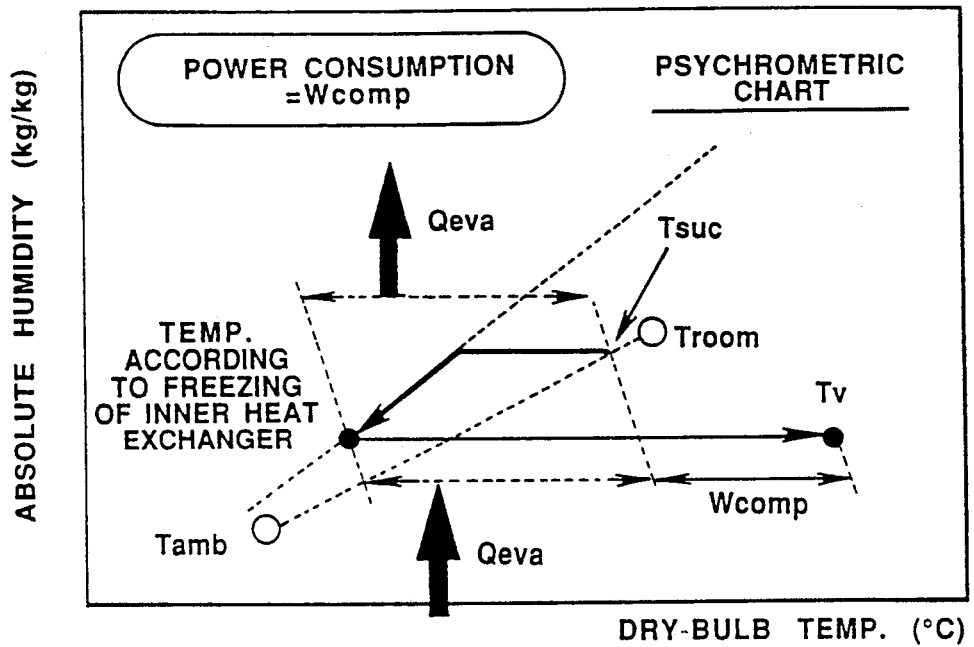
FIG. 8A is a psychrometric chart of the embodiment of FIG. 1 under a condition that the dehumidifying heating is implemented at a low temperature.
FIG. 8B is a psychrometric chart of the conventional air-conditioner under a condition that the dehumidifying heating is implemented at a low temperature.
Figure 8:
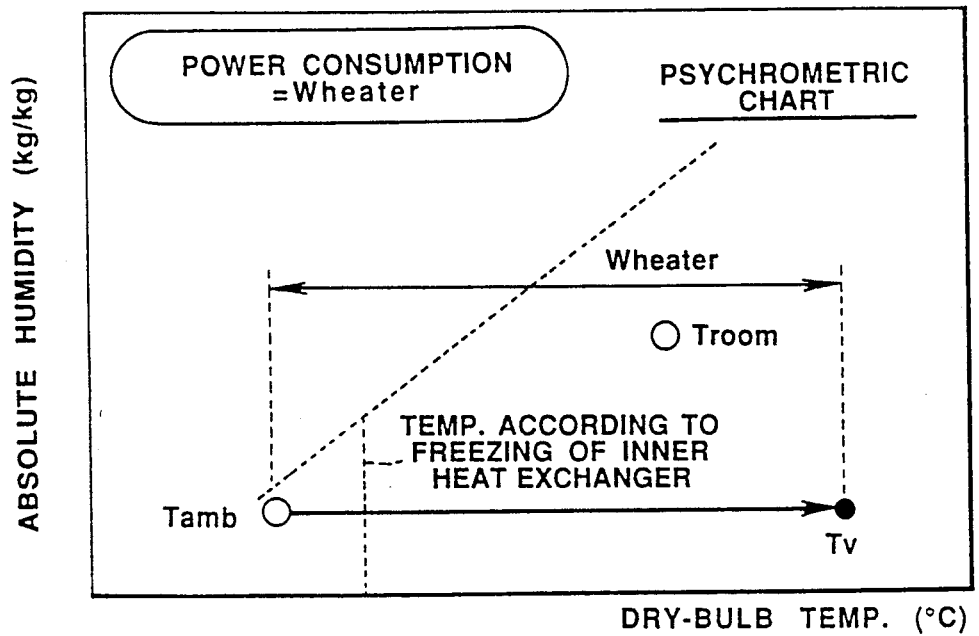

In order to maintain the compartment air temperature at the preset temperature value and to ensure the window-defogging characteristics, it is necessary to cool the air fed to the heat-absorbing inner heat exchanger 35 from a condition 0 to a condition 1 in FIG. 6 and to blow it into the compartment after reheating it to a condition 2 in FIG. 6. In this embodiment according to the present invention, the reheating operation as mentioned in the above is implemented by the heat-radiating inner heat exchanger 33, and therefore it becomes economical as compared with that of the conventional heat pump type air conditioner. That is to say, if a dehumidifying cooling operation is selected under the above-mentioned condition, the three-way valve 32 is switched as indicated by the dotted line shown in FIG. 1, and the refrigerant flows to the outer heat exchanger 38.

Furthermore, the air-mixing door 46 is fully closed. Accordingly, the air fed to the heat-absorbing inner heat exchanger 35 at the condition 0 of FIG. 6 is cooled to the condition 1. However, if the cooled air is fed into the compartment as it is, too cool air is fed to the compartment. Accordingly, it is necessary to reheat the air to the condition 2 of FIG. 6 by the electric heater or the like to supply proper conditioned-air to the compartment if a convention heat pump type air conditioner is applied. In contrast, in this embodiment according to the present invention, the energy generated by the compressor 31 and the energy which will be discharged from the outer heat exchanger 38 are recovered by the heat-radiating inner heat exchanger 33 and used for heating the air supplied to the compartment. Accordingly, this air conditioner according to the present invention is operated under a sufficiently economical mode.

In practice, under the above-mentioned condition, the bi-level mode is selected. Accordingly, a part of the conditioned-air cooled by the heat-absorbing inner heat exchanger 35 is heated by the heat-radiating inner heat exchanger 33 and blown out from the foot outlet 52. On the other hand, the air which does not pass through the heat-radiating inner heat exchanger 33 is blown out from the ventilator outlet 52 to a near portion of a passenger's face. Therefore, the passenger is kept comfortable. If the temperature condition is in the condition 0 of FIG. 6, the heating operation is selected. Accordingly, the air fed to the heat-absorbing inner heat exchanger 35 is cooled to a temperature lower than that of the condition 1 and blown into the compartment after being reheated to the condition 0 by the heat-radiating inner heat exchanger 33. Although the heat amount corresponding to the $Q_b$ of FIG. 6 is radiated into the compartment, the raising degree of the real outlet air temperature is about 1° C., and therefore no trouble is caused by this heat radiation to the compartment.

Furthermore, under this condition, the amount of inlet air is increased by controlling the intake door 42, and the temperature of the air fed to the heat-absorbing inner heat exchanger 35 is lowered, so that the inlet air temperature of the heat-absorbing inner heat exchanger 35 in the condition 0 approaches the condition 2. Accordingly, the excess amount of the heat amount is suppressed and therefore the system is economically operated.

With the thus arranged embodiment of the system according to the present invention, under a condition that it is necessary to implement the heating operation, the target conditioned-air temperature $T_{of}$ becomes lower than the window-defogging temperature $T_{fine}$ (upper-limit cooling temperature). Accordingly, the air fed to the heat-absorbing inner heat exchanger 35 is cooled to the target temperature $T_{of}$ and fed into the compartment. On the other hand, under a condition that it is necessary to implement the operation, since the window-defogging temperature $T_{fine}$ becomes lower than the target conditioned-air temperature $T_{of}$, the air fed to the heat-absorbing inner heat exchanger 35 is cooled to a temperature at which window-clouding is sufficiently prevented and is reheated to the target conditioned-air temperature $T_{of}$ by the heat-radiating inner heat exchanger 35. Then, the conditioned air is fed into the compartment. The outlet air temperature $T_{out}$ is controlled by controlling the workload of the compressor 31 such that the air temperature cooled by the heat-absorbing inner heat exchanger 35 is primarily adjusted in the range between the upper-limit $T_{fine}$, at which the window clouding or fogging is prevented, and the lower-limit cooling temperature $T_{seto}$, at which the heat-absorbing inner heat exchanger 35 is prevented from being frozen. Accordingly, the window-clouding is securely prevented.

FIGS. 7A, 7B, 8A, and 8B show a comparison of the dehumidifying heating operations of the embodiment of the air conditioner according to the present invention and that of the conventional air conditioner. In the Figures, a horizontal axis represents a dry bulb temperature (°C.), and a vertical axis represents an absolute humidity (kg/kg). In FIGS. 7A and 7B, normal heating operations at a somewhat high temperature are compared. In FIGS. 8A and 8B, normal heating operations at a low temperature are compared. FIGS. 7A and 8A represent psychrometric charts of the dehumidifying heating according to the embodiment of the air conditioner according to the present invention. FIGS. 7B and 8B represent psychrometric charts of the conventional heat-pump type air conditioner.

When a normal heating operation is implemented, as shown in FIG. 7B, the conventional heat pump type air conditioner dehumidifies the air fed to the heat-absorbing heat exchanger 35 by lowering the suction air temperature $T_{suc}$, that is, by lowering the ambient air temperature $T_{amb}$ to a temperature at which the window-clouding is not caused. This operation is implemented by the power of the compressor input $W_{comp}$. Following this, the dehumidified air is reheated until the ventilator air temperature $T_v$ becomes a target conditioned-air temperature.

In contrast, as shown in FIG. 7A, the air conditioner according to the present invention dehumidifies the air at the temperature $T_{suc}$ by cooling to a temperature at which the window-clouding is not caused by means of the heat-absorbing inner heat exchanger 35. Then, the dehumidified air is heated by the heat-exchange of the heat-radiating inner heat exchanger 33 without using the electric heater such that the ventilated air temperature $T_v$ becomes a target conditioned-air temperature $T_{of}$. In this operation, since the heating of the air is implemented by applying the heat-exchange by the heat-radiating inner heat exchanger 33, the heat-absorbing amount $Q_{eva}$ by the heat-absorbing inner heat exchanger 35 is canceled. Accordingly, the ventilated air is further heated by a heat amount corresponding to the compressor input $W_{comp}$ and blown out.

During the heating operation at a low ambient temperature $T_{amb}$, that is, at a condition that the ambient air temperature is lower than 0° or 2° C., the conventional air conditioner heats the ambient air by means of the input power $W_{heater}$ of an electric heater in order to ensure the window-defogging, as shown in FIG. 8B. In contrast, the air conditioner according to the present invention cools the intake air to a temperature which is determined according to the freezing of the heat-absorbing inner heat exchanger 35, and the air conditioner heats the air to the ventilated air temperature $T_v$ by the heat-radiating inner heat exchanger 35. The heating operation is implemented in such a manner to recover the heat-absorbing amount of the heat-absorbing inner heat exchanger 35 and the compressor input $W_{comp}$, as is similar to that in FIG. 7A.

With the thus arranged heat pump type air conditioner according to the present invention, the dehumidifying heating operation is implemented by recovering the heat-absorbing amount of the heat-absorbing inner heat exchanger 35 and the compressor input $W_{comp}$ without using the input power of the electric heater and the like. Accordingly, the electric power consumption is largely decreased. Further, as is clear by the comparison between the operations shown in FIGS. 7A, 7B, 8A and 8B, the dehumidifying heating operation is stably implemented even if the ambient temperature changes. This enables the heat-pump type air conditioner according to the present invention to implement an extremely stable operation.

Figure 9:
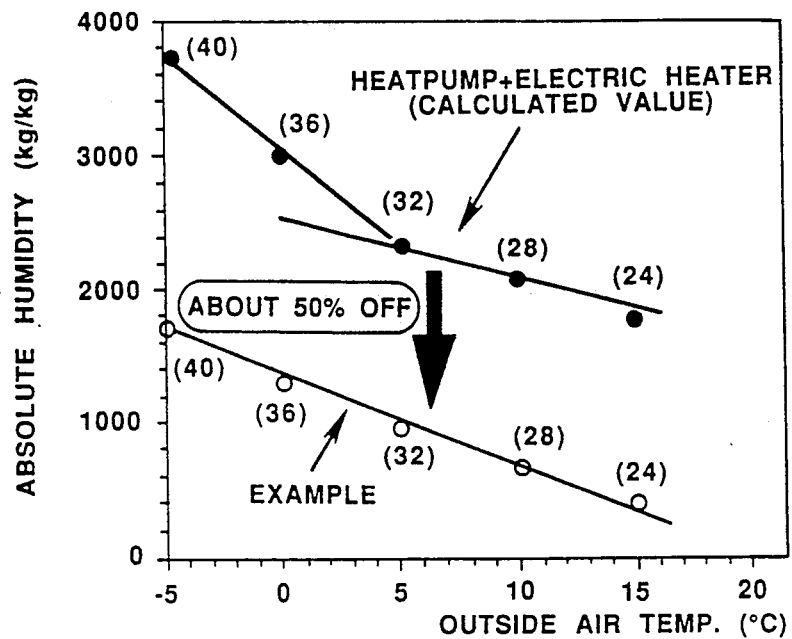
FIG. 9 is a graph in which electric power consumption of the embodiment of FIG. 1 and the conventional heat-pump type air conditioner are compared.

FIG. 9 shows a comparison of electric power consumption relative to the same ventilated air temperature under a dehumidifying heating operation. Values indicated by dots in FIG. 9 were derived from the heating operation which was implemented by the electric heater without the recovery by the heat exchanger. Values indicated by small circles in FIG. 9 were derived from the operation of the air conditioner according to the present invention where the heat recovery is implemented. These operations were implemented under a condition that the air-flow amount was 4 m³/min., the preset compartment temperature $T_{ptc}$ was 25° C., and the numeral in parentheses was a target ventilated air temperature $T_{of}$. As can be clearly seen from this result, the electric power consumption of the air conditioner according to the present invention is generally one-half of that of the conventional air conditioner which uses an electric heater.

Figure 10:
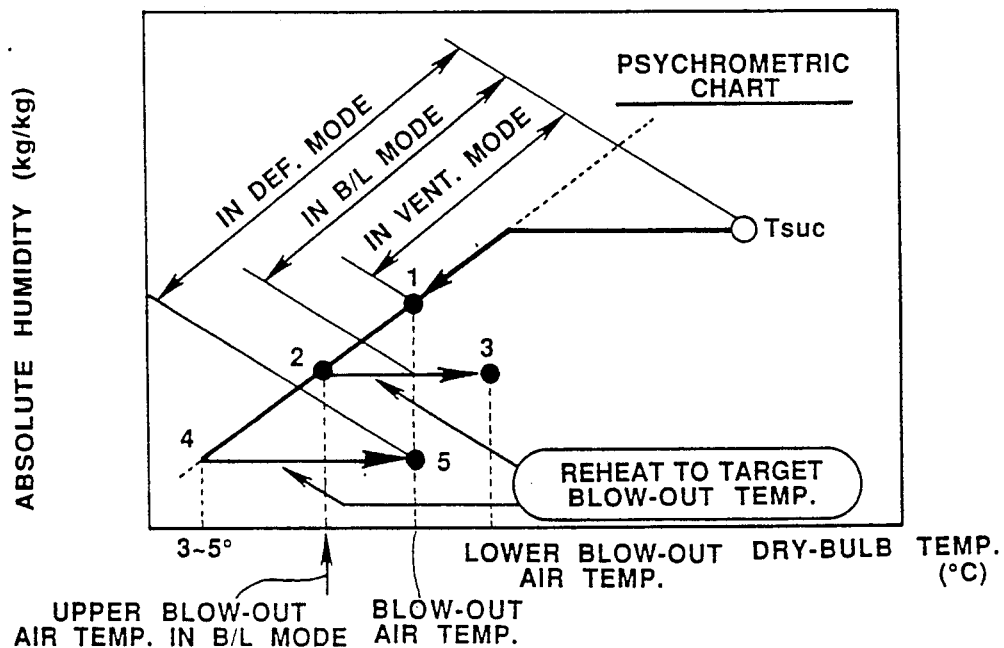
FIG. 10 is a psychrometric chart of the embodiment of FIG. 1 under a condition that the cooling operation is implemented.

FIG. 10 shows a psychrometric chart during the cooling operation of the air conditioner according to the present invention. When the vent. mode is selected, the intake air to the heat-absorbing inner heat exchanger 35 is cooled from the suction air temperature $T_{suc}$ to a condition 1 of FIG. 10 and flows into the compartment. When the bi-level mode is selected, the intake air is cooled to the condition 2 by the heat-absorbing inner heat exchanger 35 to the upper outlet air temperature in the bi-level mode. A part of the cooled air is heated to the condition 3 by the heat-radiating inner heat exchanger 33 and blown, as a lower outlet air temperature during the bi-level mode, from the foot outlet 52 to a foot portion of the passengers. Furthermore, when the def. mode is selected, the air is cooled to the condition 4 by the heat-absorbing inner heat exchanger 35 and heated to the condition 5 by the heat-radiating inner heat exchanger 35. The heated air is blown from the defroster outlet 53 into the compartment. That is to say, during the cooling operation, the reduction of the compressor input is realized by implementing the cool-heat recovery by means of the opening of the air-mixing door 46.

Figure 11:
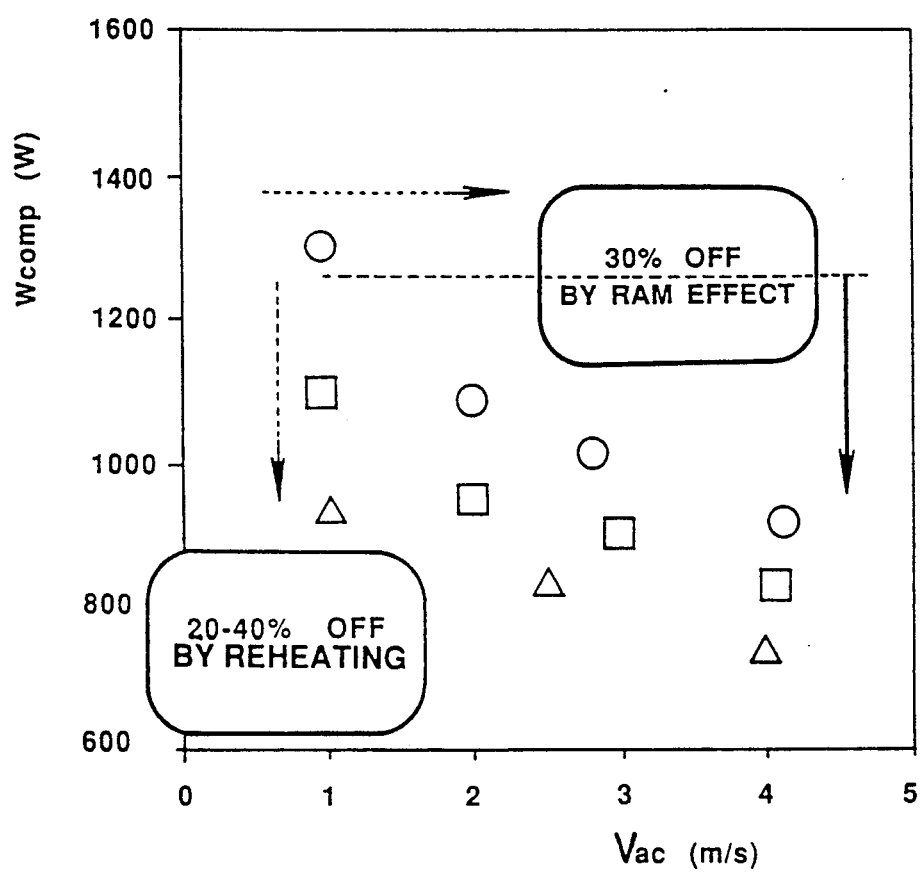
FIG. 11 is a graph showing a result of the experiment in which a reduction effect of an input of the compressor is indicated.
Figure 12:
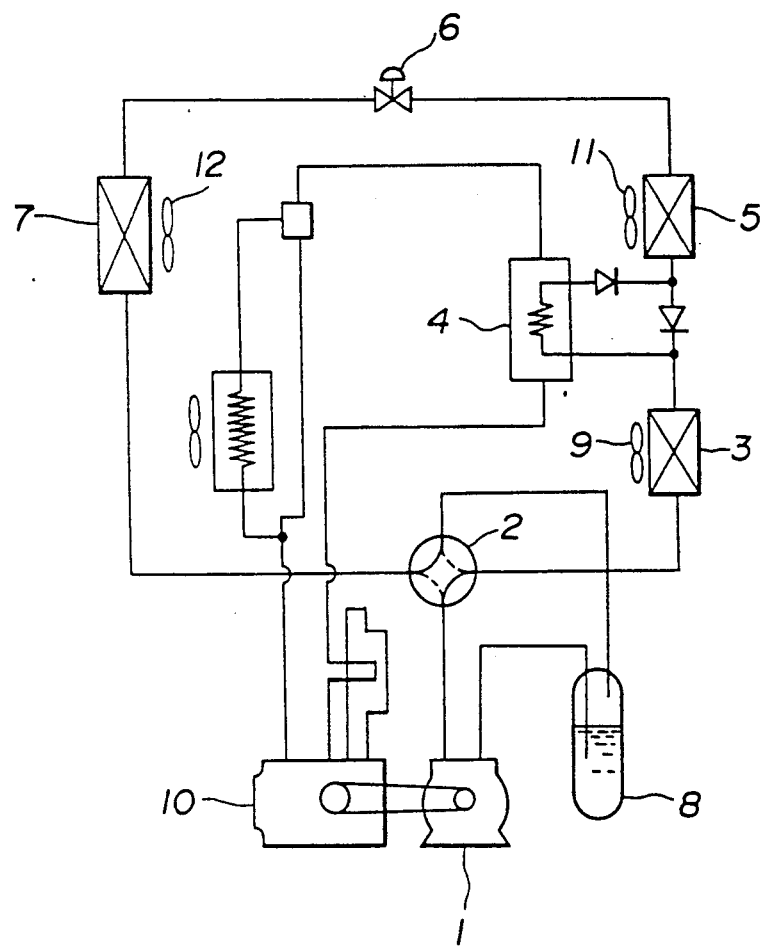
FIG. 12 is a schematic view of a conventional heat-pump type air conditioner.

FIG. 11 shows a result of the experiment with respect to the reduction effect of the an input value $W_{comp}$ of the compressor 31 during the cooling operation.

In FIG. 11, a vertical axis indicates the outlet temperature and the input value $W_{comp}$ of the compressor 31, and a horizontal axis indicates a wind speed $V_{ac}$ (m/s) (corresponding to the vehicle speed) to the outer heat exchanger 38. Since the compressor 31 is a variable displacement type and controlled by the control valve such that the outlet air temperature $T_{out}$ from the heat-absorbing inner heat exchanger 35 is set to about 4° C., the input value $W_{comp}$ of the compressor 31 is changed according to the change in the heat lead of the heat-absorbing inner heat exchanger 35. The rotation speed of the compressor 31 is 1100 rpm (fixed), and the ambient air temperature $T_{amb}$ is 25° C. Further, the opening degree $X_{dsc}$ of the air-mixing door 46 is set such that the vent. mode takes 10%, the bi-level mode takes 60%, and the def. mode takes 100%. In FIG. 11, values indicated by circles were obtained by the cooling operation in the vent. mode, values indicated by rectangles were obtained by the cooling operation in the bi-level mode, and the values indicated by triangles were obtained by the cooling operation in the def. mode. According to this result, it is clear that the reduction of the input of the compressor 31 is obtained by the heat recovery by means of the opening of the air mixing door 46 and the running of the vehicle.

What is claimed is:

1. A heat pump type air conditioner for an automotive vehicle, comprising:
   refrigerant;
   a compressor applying a workload to said refrigerant;
   an outer heat exchanger connected to a refrigerant discharge side of said compressor and radiating heat of said refrigerant into ambient air;
   a blower leading air for air-conditioning the passenger compartment of the automotive vehicle;
   a heat-radiating inner heat exchanger connected to the refrigerant discharge side of said compressor and transmitting the heat of said refrigerant to the air led by said blower;
   an expansion valve connected to a refrigerant outlet side of said heat-radiating inner heat exchanger;
   a heat-absorbing inner heat exchanger connected to a refrigerant outlet side of said expansion valve, said heat-absorbing inner heat exchanger cooling the air led by said blower by transmitting the heat of the air to said refrigerant which is supplied through said expansion valve from at least one of said outer heat exchanger and said heat-radiating inner heat exchanger;
   a switching device connecting said compressor with said outer heat exchanger and said heat-radiating inner heat exchanger, said switching device being set at one of a first state in that said compressor is fluidly communicated with said outer heat exchanger and a second state in that said compressor is fluidly communicated with said heat-radiating inner heat exchanger; and
   a control unit communicated with said switching device, said control unit selectively controlling the state of said switching device such that a temperature of air fed into the passenger compartment is controlled at a temperature at which clouding of vehicle windows is avoided and which temperature is determined from the relationship between a real compartment temperature and a real ambient temperature.

2. A heat pump type air conditioner as claimed in claim 1, wherein said compressor is of a variable displacement type in which input power is directly variable.

3. A heat pump type air conditioner as claimed in claim 1 further comprising an air mixing door which is disposed upstream of said heat-radiating inner heat exchanger so as to variably change air flow amount passing through said heat-radiating inner heat exchanger.

4. A heat pump type air conditioner as claimed in claim 1, further comprising a plurality of sensors for detecting thermal condition of the vehicle.

5. A heat pump type air conditioner as claimed in claim 4, wherein said control unit has means for selecting a temperature at which clouding or fogging of windows of the automotive vehicle is avoided, in accordance with the thermal condition.

6. A heat pump type air conditioner for an automotive vehicle, said air conditioner controlling a condition of a passenger compartment of the automotive vehicle by its cooling and heating operations, said air conditioner comprising:
   refrigerant;
   a compressor applying a workload to said refrigerant;
   an outer heat exchanger connected to a refrigerant discharge side of said compressor and radiating heat of said refrigerant into ambient air;
   a blower leading air for air-conditioning the passenger compartment of the automotive vehicle;
   a heat-radiating inner heat exchanger connected to the refrigerant discharge side of said compressor and transmitting the heat of said refrigerant to the air led by said blower;
   an expansion valve connected to a refrigerant outlet side of said heat-radiating inner heat exchanger;
   a heat-absorbing inner heat exchanger connected to a refrigerant outlet side of said expansion valve, said heat-absorbing inner heat exchanger cooling the air led by said blower by transmitting the heat of the air to said refrigerant which is supplied through said expansion valve from at least one of said outer heat exchanger and said heat-radiating inner heat exchanger;
   a switching valve disposed among the refrigerant discharge side of said compressor, a refrigerant inlet side of said outer heat exchanger and a refrigerant inlet side of said heat-radiating inner heat exchanger, said switching valve leading the refrigerant from said compressor to said outer heat exchanger during the cooling operation, said switching valve leading said refrigerant to said heat-radiating inner heat exchanger without leading to said outer heat exchanger during the heating operation; and
   a control unit communicated with said switching valve, said control unit controlling said switching valve so as to implement a switching between the cooling and heating operations when a target outlet air temperature according to thermal information of the automotive vehicle generally corresponds to a boundary temperature which does not cause clouding of windows of the automotive vehicle and which temperature is determined from the relationship between a compartment temperature and an ambient temperature.

7. A heat pump type air conditioner for an automotive vehicle, said air conditioner controlling a condition of a passenger compartment of the automotive vehicle by its cooling and heating operations, said air conditioner comprising:
   refrigerant;
   a compressor applying a workload to said refrigerant;
   an outer heat exchanger connected to a refrigerant discharge side of said compressor and radiating heat of said refrigerant into ambient air;
   a blower leading air for air-conditioning the passenger compartment of the automotive vehicle;
   a heat-radiating inner heat exchanger connected to the refrigerant discharge side of said compressor and transmitting the heat of said refrigerant to the air led by said blower;

an expansion valve connected to a refrigerant outlet side of said heat-radiating inner heat exchanger;

a heat-absorbing inner heat exchanger connected to a refrigerant outlet side of said expansion valve, said heat-absorbing inner heat exchanger cooling the air led by said blower by transmitting the heat of the air to said refrigerant which is supplied through said expansion valve from at least one of said outer heat exchanger and said heat-radiating inner heat exchanger;

a switching valve disposed among the refrigerant discharge side of said compressor, a refrigerant inlet side of said outer heat exchanger and a refrigerant inlet side of said heat-radiating inner heat exchanger, said switching valve leading the refrigerant from said compressor to said outer heat exchanger during the cooling operation, said switching valve leading said refrigerant to said heat-radiating inner heat exchanger without leading it to said outer heat exchanger during the heating operation; and a means for primarily setting an outlet air temperature from said heat-absorbing inner heat exchanger within an area which is lower than an upper limit temperature does not cause which clouding or fogging of windows of the automotive vehicle and which temperature is determined from the relationship between a real compartment temperature and an ambient temperature, and which area is higher than a lower limit temperature at which said heat-absorbing inner heat exchanger is frozen, during the heating operation.

8. A heat pump type air conditioner for an automotive vehicle, said air conditioner controlling a condition of a passenger compartment of the automotive vehicle by its cooling and heating operations, said aid conditioner comprising:

a compressor;

a three-way valve connected to said compressor;

an outer condenser connected to said three-way valve;

an inner condenser connected to said three-way valve and said outer condenser;

an expansion valve connected to said inner condenser;

an evaporator connected to said expansion valve and said compressor; and refrigerant circulating a circuit constituted by said compressor, said three-way valve, said outer condenser, said inner condenser, said expansion valve and said evaporator;

wherein said three-way valve fluidly communicates said compressor and said outer condenser during the cooling operation and communicates said compressor and said inner condenser while fluidly isolating said outer condenser during the heating operation, a state of said three-way valve being changed from a state in the cooling operation to a state in the heating operation when a target conditioned-air temperature according to thermal information of the automotive vehicle corresponds to a boundary temperature which does not caused clouding of windows of the automotive vehicle and which boundary temperature is determined from the relationship between a compartment temperature and an ambient temperature.

* * * * *